United States Patent
Johnson

(10) Patent No.: US 6,169,383 B1
(45) Date of Patent: Jan. 2, 2001

(54) SELF ADAPTING MOTOR CONTROLLER

(75) Inventor: Lynn Stewart Johnson, Aurora, IL (US)

(73) Assignee: Siemens Energy & Automation, Inc., Alpharetta, GA (US)

(*) Notice: Under 35 U.S.C. 154(b), the term of this patent shall be extended for 0 days.

(21) Appl. No.: 09/165,679

(22) Filed: Oct. 2, 1998

(51) Int. Cl.[7] .................................. H02P 7/48; H02P 1/32
(52) U.S. Cl. ........................ 318/771; 318/773; 318/776
(58) Field of Search ................................ 318/770–832; 363/32, 40, 48

(56) References Cited

U.S. PATENT DOCUMENTS

| | | | |
|---|---|---|---|
| 3,678,358 | * 7/1972 | Kolatorowicz | 318/254 |
| 4,425,539 | * 1/1984 | Wills | 318/771 |
| 4,477,760 | * 10/1984 | Kuznetsov | 318/773 |
| 4,734,639 | * 3/1988 | Saletta et al. | 324/107 |
| 4,792,740 | * 12/1988 | Smith | 318/768 |
| 4,910,450 | * 3/1990 | Parker et al. | 318/811 |
| 4,916,376 | * 4/1990 | Kume et al. | 318/808 |
| 5,614,799 | * 3/1997 | Anderson et al. | 318/439 |
| 5,708,337 | * 1/1998 | Breit et al. | 318/439 |

* cited by examiner

*Primary Examiner*—Paul Ip

(57) ABSTRACT

Problems associated with maintaining a large inventory of multiple types of motor controllers designed to accommodate a single motor type are eliminated in a motor controller that automatically senses if it connected to a delta motor or a wye motor and configures itself for operation in a compatible mode.

11 Claims, 5 Drawing Sheets

L1-L2
FROM UTILITY POWER

L2-L3
FROM UTILITY POWER

L3-L1
FROM UTILITY POWER

L1-N
FROM UTILITY POWER

L2-N
FROM UTILITY POWER

L3-N
FROM UTILITY POWER (L1-T1>0)
EXPECTED SIGNAL FROM DELTA MOTOR (L2-T2>0)
EXPECTED SIGNAL FROM DELTA MOTOR (L3-T3>0)
EXPECTED SIGNAL FROM DELTA MOTOR (L1-T1>0)
EXPECTED SIGNAL FROM DELTA MOTOR (L2-T2>0)
EXPECTED SIGNAL FROM DELTA MOTOR (L3-T3>0)
EXPECTED SIGNAL FROM DELTA MOTOR

SELF ADAPTING MOTOR CONTROLLER

FIELD OF THE INVENTION

This invention relates to motor controllers, and more particularly, to a motor controller that automatically senses whether it has been connected to a delta motor or a wye motor and configures itself in the correct mode for operation with the specific motor configuration.

BACKGROUND OF THE INVENTION

During start up, multiphase motors often experience potentially damaging high inrush currents and starting torques. This can adversely effect the performance of the drive and increase general wear and tear leading to higher maintenance costs. In addition, current peaks during motor start up may also cause voltage disturbances in the power supply. Motor controllers are typically employed to restrict motor torque and reduce high starting currents.

A motor controller operates by selectively opening and closing a plurality of switches connecting the motor terminals to the power source. The operation of the motor is dependent upon the proper regulation of the switches. Solid state motor controllers often employ phase control techniques to gradually increase or decrease the voltage applied to the motor using solid state switching devices.

Multiphase motors generally have their windings arranged in either a delta configuration or a wye configuration. Prior art motor controllers have to be specifically manufactured to operate with either a delta motor or a wye motor. This requires the maintenance of a larger inventory of multiple types of motor controllers to accommodate the different motor configurations and can lead to increased storage costs.

Clearly it would be desirable to use a self adapting motor controller that automatically senses if it is connected to a delta motor or a wye motor and automatically configures itself for operation in a compatible mode. The present invention seeks to achieve these objectives.

SUMMARY OF THE INVENTION

It is a principal object of this invention to provide a new and improved motor controller that automatically senses if it is connected to a delta motor or a wye motor and adapts itself to operate in a compatible mode. More specifically, it is an object of the invention to provide such a motor controller that eliminates the need to maintain an inventory of multiple types of motor controllers designed to accommodate only one type of motor.

An exemplary embodiment of the invention achieves the foregoing object in a motor controller. The motor controller is designed to control a plurality of switching means that are adapted to be connectable between a multiphase power source and the motor windings of a multiphase motor. A configuration detection circuit is operatively connected to the multiphase motor windings and automatically detects if the multiphase motor windings are arranged in a first configuration or in a second configuration. A controller circuit connected between the configuration detection circuit and the switching means responds to the windings being arranged in a first configuration by controlling the switching means in a first mode and responds to the windings being arranged in a second configuration by controlling the switching means in a second mode.

In a preferred embodiment, the plurality of switching means are solid state devices.

In a highly preferred embodiment, the plurality of switching means are triacs or SCRs.

In another form of the invention, the configuration detection circuit may include a sensing circuit that is connectable between the first, second and third supply lines of a multiphase power source and the first, second and third windings of a multiphase motor. The sensing circuit generates an output representative of the voltages across each of the first, second and third switching means, the first, second and third line to line voltages and the first, second and third line to neutral voltages.

The configuration detection circuit may also include a decoding circuit connected to the sensing circuit for determining whether the windings are arranged in a delta configuration or in a wye configuration.

The motor windings can be identified as being in a delta configuration when the first line to line voltage and the voltage across the first switching means are synchronously greater than zero and the second line to line voltage and the voltage across the second switching means are synchronously greater than zero and the third line to line voltage and the voltage across the third switching means are synchronously greater than zero.

The motor windings can be determined to be in a wye configuration when the first line to neutral voltage and the voltage across the first switching means are synchronously greater than zero and the second line to neutral voltage and the voltage across the second switching means are synchronously greater than zero and the third line to neutral voltage and the voltage across the third switching means are synchronously greater than zero.

Other objects and advantages of the invention will become apparent from the following specification taken in conjunction with the accompanying drawings.

BRIEF DESCRIPTION OF THE DRAWINGS

The accompanying drawings, which are incorporated herein and constitute part of this specification, illustrate presently preferred embodiments of the invention, and, together with a general description given above and the detailed description of the preferred embodiments given below, serve to explain the principles of the invention.

DETAILED DESCRIPTION OF THE DRAWINGS

In the following detailed description, certain specific terminology will be employed for the sake of clarity and a particular exemplary embodiment described, but it is to be understood that the same is not intended to be limiting and should not be so construed inasmuch as the invention is capable of taking many forms within the scope of the appended claims intended environment.

Figure 1:
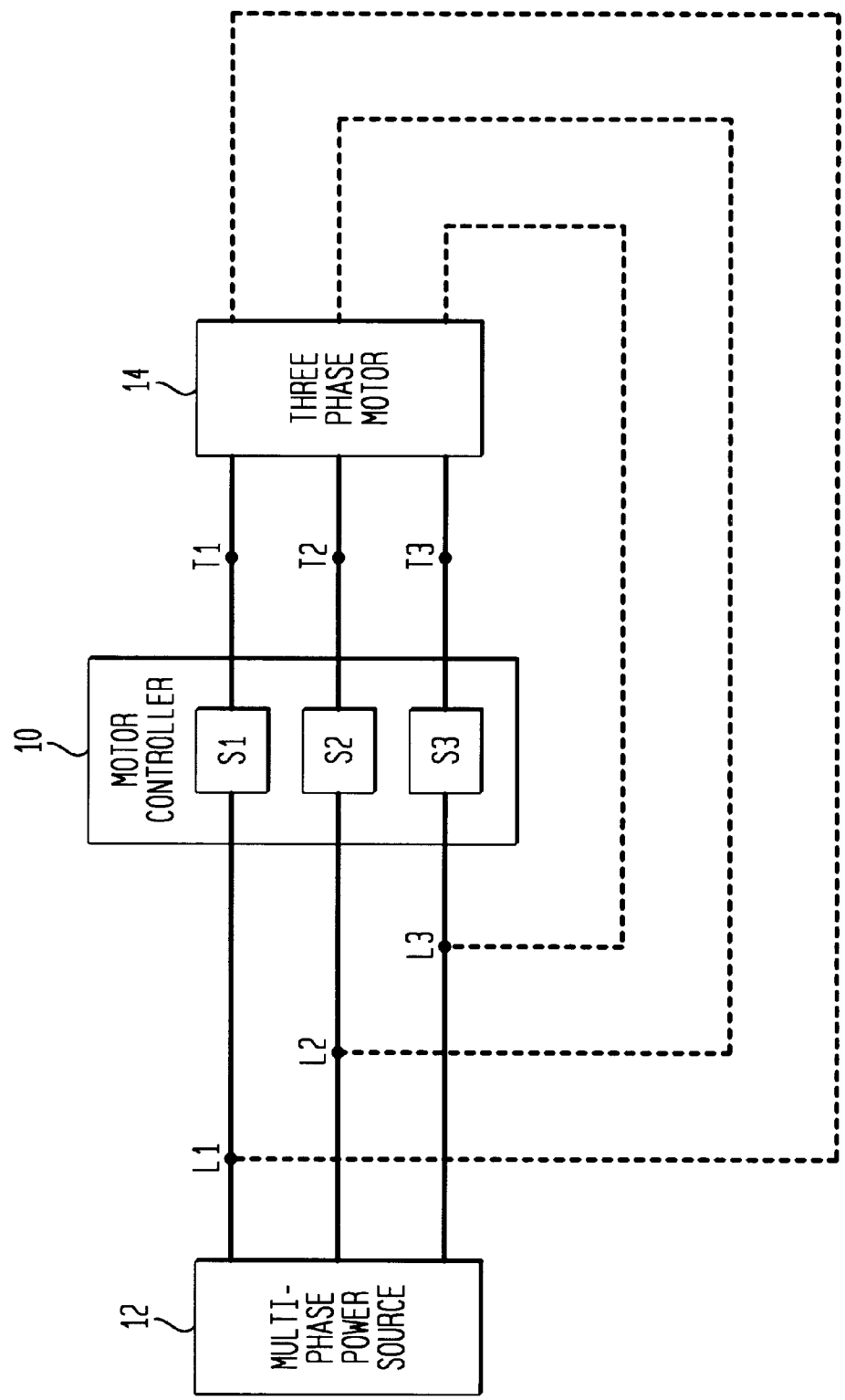
FIG. 1 shows the motor controller according to the invention in its intended environment.

The motor controller 10 has a plurality of switches S1, S2, S3 providing electrical connection between the line voltage terminals L1, L2, L3 of a multiphase power source 12 and the terminals T1, T2, T3 of a three phase motor 14. The three phase motor 14 may be a delta motor characterized by having its windings arranged in a delta configuration or a wye motor having its windings arranged in a wye configuration. The delta motor requires additional wiring to the multiphase power source 12 as illustrated by the broken lines in FIG. 1.

According to the invention, the motor controller 10 has at least two operational modes: a first mode where the motor controller 10 is adapted to operate with a delta motor and a second mode where the motor controller is adapted to operate with a wye motor. The motor controller 10 is designed to automatically sense whether it is connected to a delta motor or a wye motor and configure itself to perform in a compatible mode.

The motor controller 10 operates by selectively opening and closing the switches S1, S2, S3 to regulate the voltage applied from the multiphase power source 12 to the three phase motor 14. Solid state switches such as triacs or SCRs are used in a preferred embodiment of the invention.

Figure 2:
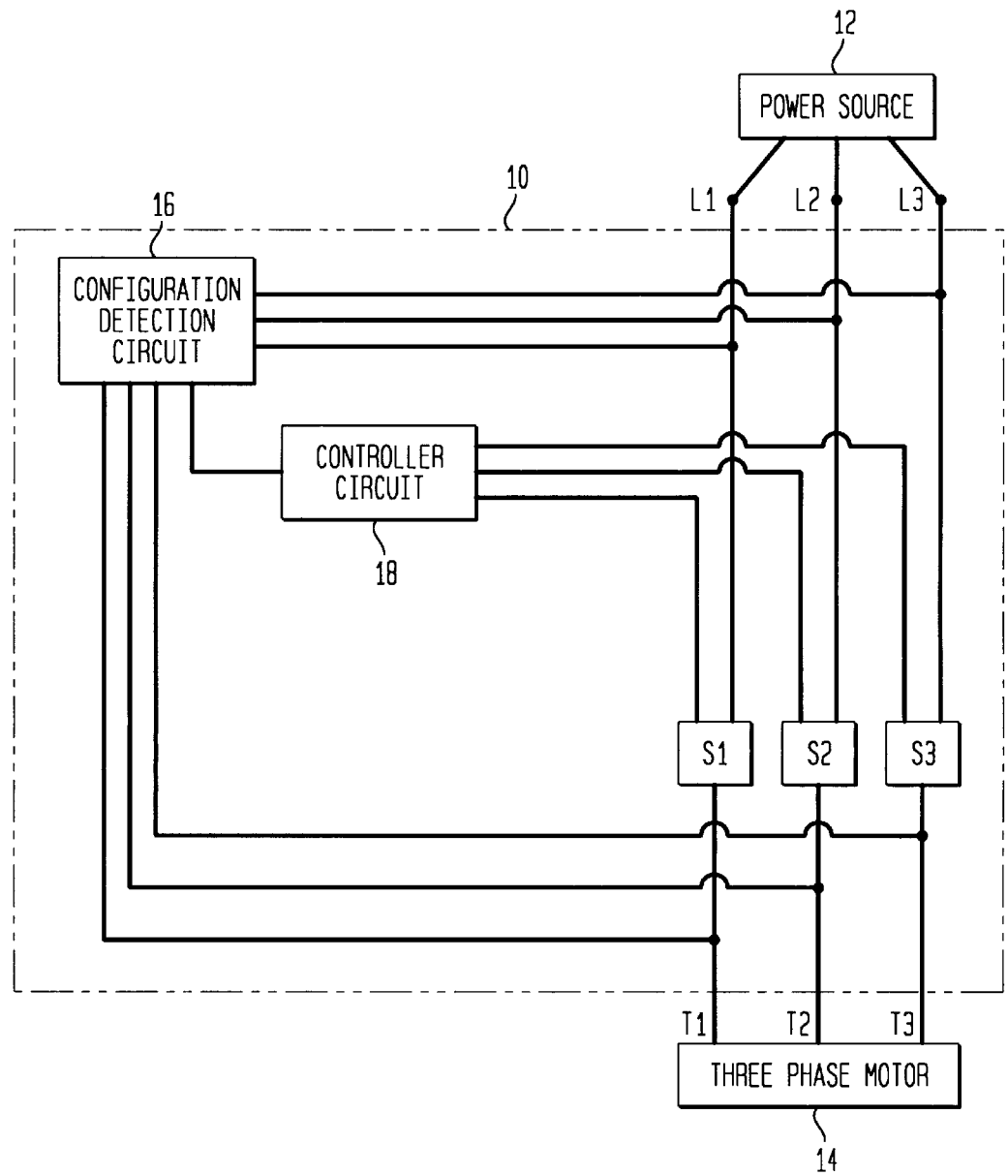
FIG. 2 is a schematic diagram of the primary elements of the motor controller and their connections to a multiphase power source card a multiphase motor.

The motor controller 10, illustrated in further detail in FIG. 2, generally includes the plurality of switches S1, S2, S3, a configuration detection circuit 16 and a controller circuit 18. The configuration detection circuit 16 is electrically coupled to the line voltage terminals L1, L2, L3 and to the motor terminals T1, T2, T3. The configuration detection circuit 16 manipulates the voltage readings obtained from the multiphase power source 12 and the three phase motor 14 to identify the configuration of the motor connected to the motor controller 10 and generates one of two indicator signals to convey this information to the controller circuit 18. If the controller circuit 18 receives a delta indicator signal, the controller circuit 18 is configured to operate in the first mode, compatible with a delta motor and if a wye indicator signal is received, the controller circuit 18 is configured to operate in the second mode, compatible with a wye motor. The controller circuit 18 directs the opening and closing of the switches S1, S2, S3 to regulate the application of voltage to the three phase motor 14. The operational mode of the controller circuit 18 determines the manner which the controller circuit 18 operates the switches S1 S2, S3. In the illustrated embodiment, the controller circuit functions are performed by a programmed microcontroller.

Figure 3:
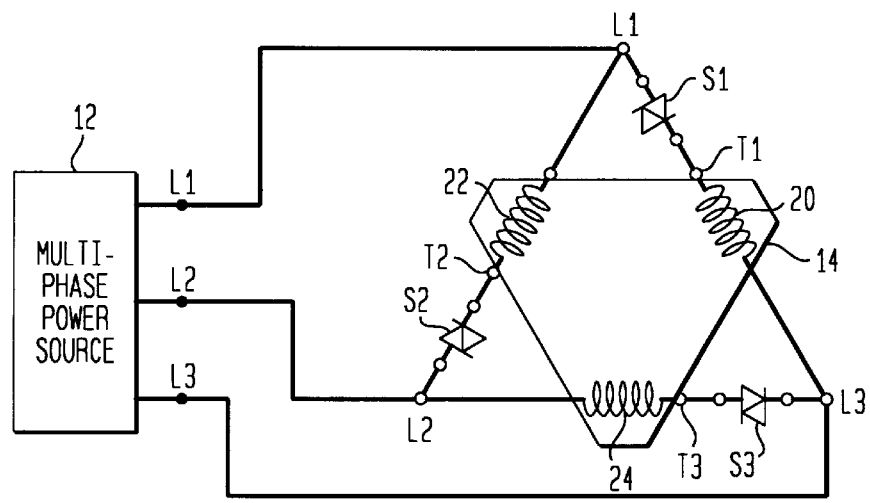
FIG. 3 illustrates the relationship between the motor controller switching means and a delta motor.

FIG. 3 shows the placement of the motor controller switches S1, S2, S3 relative to the multiphase power source 12 and a three phase motor 14 having its windings 20, 22, 24 arranged in a delta configuration. When the three phase motor 14 is in a deenergized state, the following conditions hold true:

Voltage (L1–T1)=Voltage (L1–L2)

Voltage (L2–T2)=Voltage (L2–L3)

Voltage (L3–T3)=Voltage (L3–T3)

Figure 4:
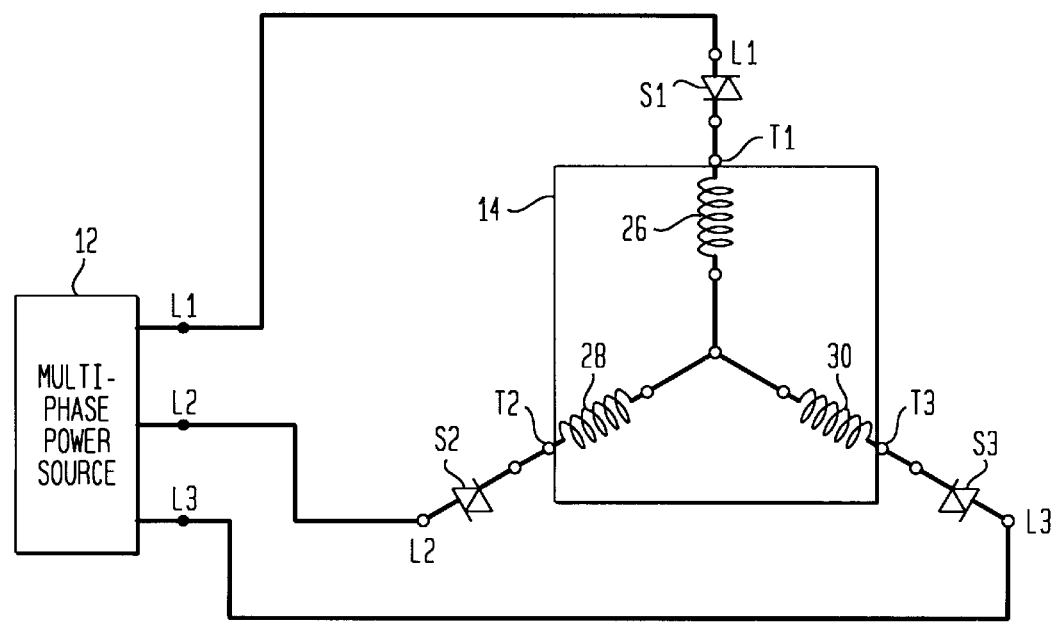
FIG. 4 depicts the relationship between the motor controller switching means and a wye motor.

FIG. 4 illustrates the connections between the motor controller switches S1, S2, S3, the multiphase power source 12 and a three phase motor 14 having its windings 26, 28, 30 arranged in a wye configuration. When the three phase motor 14 is in a deenergized state, the following conditions hold true:

Voltage (L1–T1)=Voltage (L1–N)

Voltage (L2–T2)=Voltage (L2–N)

Voltage (L3–T3)=Voltage (L3–N)

Figure 5:
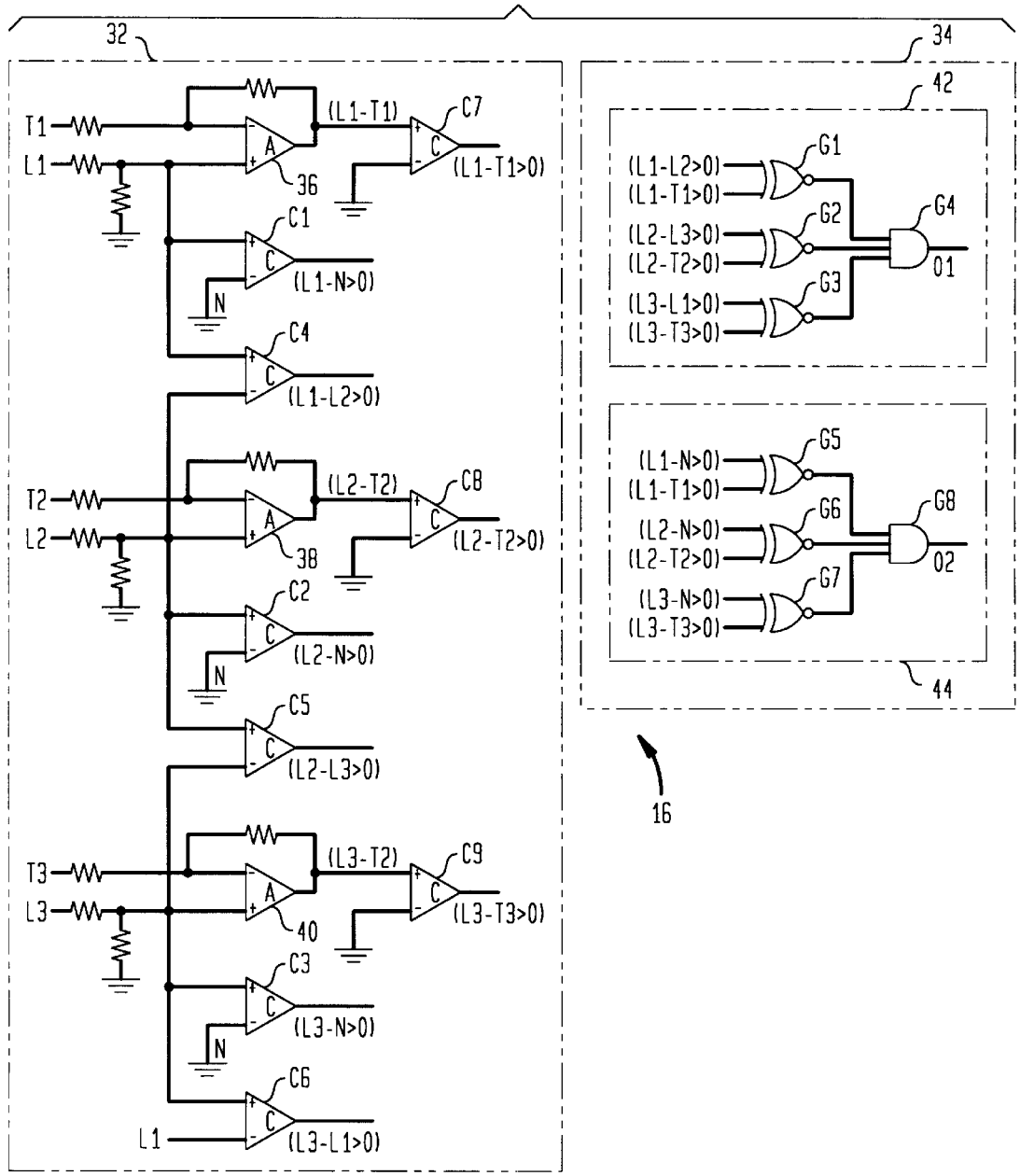
FIG. 5 is a schematic representation of the configuration detection circuit.

A preferred embodiment of the configuration detection circuit 16 includes a sensing circuit 32 and a decoding circuit 34 as shown in FIG. 5. The sensing circuit 32 accepts the three line voltages L1, L2, L3 and the three motor terminal voltages T1, T2, T3 as inputs and generates a true signal for each of the following conditions that are found to be true:

Line to Neutral Voltages

Voltage (L1–N)>0

Voltage (L2–N)>0

Voltage (L3–N)>0

Line to Line Voltages

Voltage (L1–L2)>0

Voltage (L2–L3)>0

Voltage (L3–L1)>0

Voltages across the motor controller switches

Voltage (L1–T1)>0

Voltage (L2–T2)>0

Voltage (L3–T3)>0

The sensing circuit 32 includes a set of three comparators C1, C2, C3 that determine whether each of the line to neutral voltages (L1–N), (L2–N), (L3–N) are greater than zero. The comparators C1, C2, C3 accept the line voltages L1, L2, L3 as inputs and compare each of them to a signal representative of the floating ground N. The output generated by each of the comparators C1, C2, C3 is true when its respective line to neutral voltage is greater than zero. For example, when the first line to neutral voltage (L1–N) is greater than zero, the comparator C1 issues a true signal.

A second set of comparators C4, C5, C6 in the sensing circuit 32 are used to determine whether each of the line to line voltages (L1–L2), (L2–L3), (L3–L1) are greater than zero. The comparators C4, C5, C6 accept the line voltage pairs L1 and L2, L2 and L3, L3 and L1 respectively as inputs and generate a true signal for every line to line voltage (L1–L2), (L2–L3), (L3–L1) that is greater than zero. For example, when the first line to line voltage (L1–L2) is greater than zero, the first comparator C4 generates a high signal.

The sensing circuit 32 also includes a series of amplifiers 36, 38, 40 and comparators C7, C8, C9 to identify when the voltages across the motor controller switches (L1–T1), (L2–T2), (L3–T3) are greater than zero. The amplifiers 36, 38, 40 accept the line voltages L1, L2, L3 respectively and the voltages at the motor terminals T1, T2, T3 respectively as inputs and generate the potential differences between them as outputs (L1–T1), (L2–T2), (L3–T3). These output voltages (L1–T1), (L2–T2), (L3–T3) represent the voltages across each of the motor controller switches S1, S2, S3.

The output voltages (L1–T1), (L2–T2), (L3–T3) generated by the amplifiers 36, 38, 40 are fed into a series of comparators C7, C8, C9, respectively, to determine whether the voltages across the switches (L1–T1), (L2–T2), (L3–T3) are greater than zero. The third set of comparators C7, C8, C9 compare the voltages across the switches (L1–T1), (L2–T2), (L3–T3) to ground and issue a true signal for every voltage (L1–T1), (L2–12), (L3–T3) that is greater than zero.

The decoding circuit 34 accepts and decodes the digital signals associated with the line to neutral voltages (L1–N), (L2–N), (L3–N), the line to line voltages (L1–L2), (L2–L3), (L3–L1), and the voltages across the switches (L1–T1), (L2–T2), (L3–T3) generated by the sensing circuit 32 and issues either a delta indicator signal at O1 or a wye indicator signal at O2. The decoding circuit 34 includes two subcircuits: a delta decoding circuit 42 that generates a delta indicator signal at O1 if the circuit determines that the motor windings are arranged in a delta configuration and a wye decoding circuit 44 that generates a wye indicator signal at O2 if the circuit determines that the motor windings are arranged in a wye configuration.

The delta decoding circuit 42 includes three exclusive NOR gates G1, G2, G3 whose outputs are fed into an AND gate G4. Each of the exclusive NOR gates have the digital signals associated with a line to line voltage and the voltage across the corresponding switch as inputs. To illustrate the operation of the logic, note that exclusive NOR gate G1 has the digital signals associated with (L1–L2) and (L1–T1) as its inputs and generates a high or a true output whenever both (L1–L2) and (L1–T1) are greater than zero or when both signals are not greater than zero or in other words, when the two signals are in synch. The other two exclusive NOR gates G2, G3 manipulate the digital signals for the voltage pairs (L2–L3), (L2–T2) and (L3–L1), (L3–T3), respectively, in a similar manner. The AND gate G4 accepts the outputs generated by the three exclusive NOR gates G1, G2, G3 and generates a true signal when all of the three pairs of signals appear to be synchronized with each other. This true signal is the delta indicator signal and causes the motor controller 10 to operate in a mode that is compatible with a delta motor.

The wye decoding circuit 44 also includes three exclusive NOR gates G5, G6, G7 whose outputs are fed into an AND gate G8. In this case, each of the exclusive NOR gates have the digital signals associated with a line to neutral voltage and the voltage across the corresponding switch as inputs. For example, the exclusive NOR gate G5 has the digital signals associated with (L1–N) and (L1–T1) as its inputs and generates a high or true output whenever both (L1–N) and (L1–T1) are greater than zero or when both signals are not greater than zero or in other words, when the two signals are in synch. The other exclusive NOR gates G6, G7 manipulate the digital signals for the voltage pairs (L2–N), (L2–T2) and (L3–N), (L3–13), respectively, in an analogous manner. The AND gate G8 accepts the outputs generated by the three exclusive NOR gates G5, G6, G7 and generates a true signal when all of the three pairs of signals are synchronized with each other. This true signal is the wye indicator signal and causes the motor controller 10 to operate in a mode that is compatible with a wye motor. In a preferred embodiment of the invention, the logical functions shown in the decoding circuit 34 are executed by the microcontroller 18.

FIG. 6 illustrates the analog waveforms for: the line to line voltages (L1–L2), (L2–L3), (L3–L1); the line to neutral voltages (L1–N), (L2–N), (L3–N); and the digital representations of when the voltage across the motor controller switches (L1–T1), (L2–T2), (L3–T3) are greater than zero and when they are equal to zero for a delta motor and for a wye motor. The characteristics of these waveforms are used by the decoder circuit 34 to distinguish between a delta motor and a wye motor.

Figure 6A:
FIG. 6 illustrates the waveforms for the line to line voltages, the line to neutral voltages and the expected digital signals representative of the voltages across the individual switching means for a delta motor and for a wye motor.
Figure 6B:
Figure 6C:
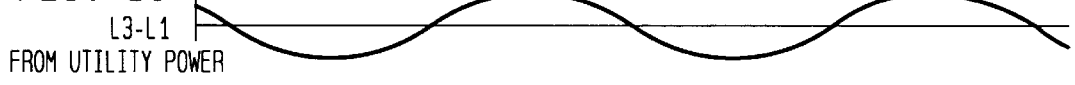
Figure 6D:
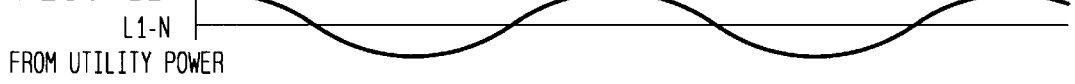
Figure 6E:
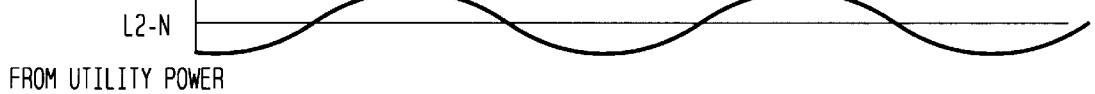
Figure 6F:
Figure 6G:
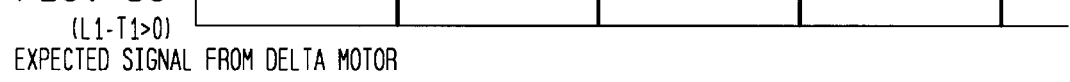
Figure 6H:
Figure 6I:

When a delta motor is connected to the motor controller 10, note that the voltage across the first switch (L1–T1), shown in FIG. 6(g) and the first line to line voltage (L1–L2), shown in FIG. 6(a), are simultaneously greater than zero and simultaneously not greater than zero. Note that this relationship also holds true for the signal pair (L2–T2) and (L2–L3), shown in FIG. 6(h) and FIG. 6(b) respectively, and the signal pair (L3–T3) and (L3–L1), shown in FIG. 6(i) and FIG. 6(c) respectively, when a delta motor is connected to the motor controller 10.

Figure 6J:
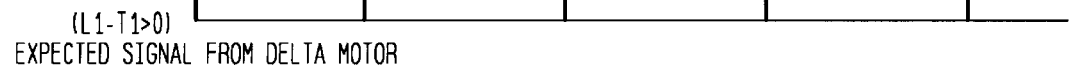
Figure 6K:
Figure 6L:
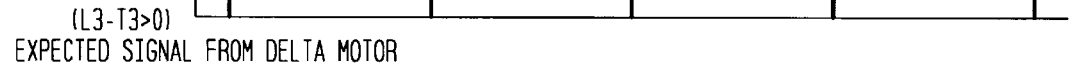

On the other hand, when a wye motor is connected to the motor controller 10, note that the voltage across the first switch (L1–T1), shown in FIG. 6(j) and the first line to neutral voltage (L1–N), shown in FIG. 6(d), are simultaneously greater than zero and simultaneously not greater than zero. Note that this relationship also holds true for the signal pair (L2–T2) and (L2–N), shown in FIG. 6(k) and FIG. 6(e) respectively, and the signal pair (L3–T3) and (L3–N), shown in FIG. 6(l) and FIG. 6(f) respectively, when a wye motor is connected to the motor controller 10.

It will be appreciated that a motor controller that automatically senses if it is connected to a delta motor or a wye motor and configures itself for operation in a mode that is compatible with the specific motor type eliminates the need to maintain an inventory of multiple types of motor controllers that are designed to accommodate only one type of motor. This results in reduce inventory and storage costs.

The foregoing disclosure of specific embodiments is intended to be illustrative of the broad concepts comprehended by the invention. It should be understood that while the preferred embodiment focuses on a particular implementation of the configuration detection circuit logic, other equivalent hardware and software implementations of the logic disclosed also fall within the scope of the invention.

What is claimed is:

1. A motor controller for controlling operation of a multiphase motor, comprising:
   a plurality of switching means connectable between a multiphase power source and multiphase motor windings;
   a configuration detection circuit operatively connected to the multiphase motor windings for automatically detecting if the multiphase motor windings are arranged in a first configuration or in a second configuration; and
   a controller circuit, connected to the configuration detection circuit and the switching means, operable to control the switching means in a first mode in response to the windings being arranged in the first configuration and in a second mode in response to the windings being arranged in the second configuration.

2. The motor controller according to claim 1 wherein the plurality of switching means comprise solid state devices.

3. The motor controller according to claim 1 wherein the plurality of switching devices comprise a plurality of triacs.

4. The motor controller according to claim 1 wherein the plurality of switching devices comprise a plurality of SCRs.

5. A motor controller for controlling operation of a multiphase motor, comprising:
   a plurality of solid state switching means connectable between first, second and third supply lines of a multiphase power source and first, second and third windings of a multiphase motor respectively;
   a configuration detection circuit operatively connectable to the first, second and third supply lines and the first, second and third windings for automatically detecting if the first, second and third windings are arranged in a delta configuration or a wye configuration; and
   a controller circuit, connected to the configuration detection circuit and the solid state switching means, operable to control the plurality of solid state switching means in a first mode in response to the windings being arranged in a delta configuration and in a second mode in response to the windings being arranged in a wye configuration.

6. The motor controller according to claim 5 wherein the plurality of solid state switching means comprise a plurality of trials.

7. The motor controller according to claim 5 wherein the plurality of solid state switching means comprise a plurality of SCRs.

8. The motor controller according to claim 5 wherein the plurality of solid state switching means comprises a first, second and third solid state switching means connectable between first, second and third supply lines and first, second and third motor windings respectively.

9. The motor controller according to claim 8 wherein the configuration detection circuit further comprises:
- a sensing circuit, operably connectable between first, second and third supply lines and first, second and third motor windings, operable to generate a plurality of outputs representative of each of the voltages across the first, second and third solid state switching means, first, second and third line to line voltages and first, second and third line to neutral voltages.

10. The motor controller according to claim 8 wherein the configuration detection circuit further comprises a decoding circuit connected to the sensing circuit for determining if first, second and third windings are arranged in a delta configuration or a wye configuration;
- the first, second and third windings being arranged in the delta configuration if the first line to line voltage and the voltage across the first switching means are synchronously greater than zero and the second line to line voltage and the voltage across the second switching means are synchronously greater than zero and the third line to line voltage and the voltage across the third switching means are synchronously greater than zero;
- the first, second and third windings being arranged in the wye configuration if the first line to neutral voltage and the voltage across the first switching means are synchronously greater than zero and the second line to neutral voltage and the voltage across the second switching means are synchronously greater than zero and the third line to neutral voltage and the voltage across the third switching means are synchronously greater than zero.

11. A motor controller for controlling operation of a multiphase motor, comprising:
- a first, second and third solid state switching means connectable between first, second and third supply lines of a multiphase power source and first, second and third windings of a multiphase motor respectively;
- a sensing circuit operably connectable between the first, second and third supply lines and the first, second and third motor windings, operable to generate a plurality of outputs representative of each of the voltages across the first, second and third solid state switching means, first, second and third line to line voltages and first, second and third line to neutral voltages;
- a decoding circuit connected to the sensing circuit for determining if the first, second and third windings are arranged in a delta configuration or a wye configuration;
- the first, second and third windings being arranged in the delta configuration if the first line to line voltage and the voltage across the first switching means are synchronously greater than zero and the second line to line voltage and the voltage across the second switching means are synchronously greater than zero and the third line to line voltage and the voltage across the third switching means are synchronously greater than zero;
- the first, second and third windings being arranged in the wye configuration if the first line to neutral voltage and the voltage across the first switching means are synchronously greater than zero and the second line to neutral voltage and the voltage across the second switching means are synchronously greater than zero and the third line to neutral voltage and the voltage across the third switching means are synchronously greater than zero; and
- a controller circuit, connected to the decoding circuit and the first, second and third solid state switching means, operable to control the first, second and third solid state switching means in a first mode in response to the windings being arranged in a delta configuration and in a second mode in response to the windings being arranged in a wye configuration.

* * * * *